(12) United States Patent
Chuang

(10) Patent No.: US 8,047,604 B2
(45) Date of Patent: Nov. 1, 2011

(54) BICYCLE SADDLE

(76) Inventor: Louis Chuang, Taichung (TW)

( * ) Notice: Subject to any disclaimer, the term of this patent is extended or adjusted under 35 U.S.C. 154(b) by 417 days.

(21) Appl. No.: 11/307,234

(22) Filed: Jan. 27, 2006

(65) Prior Publication Data

US 2007/0108808 A1  May 17, 2007

(30) Foreign Application Priority Data

Nov. 17, 2005  (TW) .................. 94140496 A
Jan. 27, 2006  (TW) .................. 95103691 A

(51) Int. Cl.
*B62J 1/00* (2006.01)
(52) U.S. Cl. .................. 297/202; 297/201; 297/214
(58) Field of Classification Search .................. 297/201, 297/202, 214
See application file for complete search history.

(56) References Cited

U.S. PATENT DOCUMENTS

| 629,956 A | 8/1899 | Craig ............................. 297/201 |
| 649,875 A | 3/1902 | Meighan ........................ 297/201 |
| 823,916 A | 6/1906 | Brooks et al. ................. 297/207 |
| 3,997,214 A | 12/1976 | Jacobs ........................... 297/214 |
| 4,063,775 A | 12/1977 | Mesinger ...................... 297/201 |
| 4,429,915 A | 2/1984 | Flager ........................... 297/199 |
| 4,512,608 A | 4/1985 | Erani ............................. 297/201 |
| 4,877,286 A | 10/1989 | Hobson et al. ................ 297/195 |
| 5,147,685 A | 9/1992 | Hanson .......................... 428/189 |
| 5,203,607 A | 4/1993 | Landi ............................. 297/214 |
| 5,286,082 A | 2/1994 | Hanson .......................... 297/201 |
| 5,330,249 A | 7/1994 | Weber et al. .................. 297/214 |
| 5,348,369 A | 9/1994 | Yu ................................... 297/214 |
| 5,676,420 A | 10/1997 | Kuipers et al. ................ 297/204 |
| 5,823,618 A * | 10/1998 | Fox et al. .................... 297/201 X |
| 5,911,475 A | 6/1999 | Nakahara .................. 297/219.11 |
| 5,921,624 A | 7/1999 | Wu ............................ 297/215.14 |
| 6,106,059 A | 8/2000 | Minkow et al. .............. 297/202 |
| 6,176,546 B1 | 1/2001 | Andrews .................... 297/195.1 |
| 6,402,236 B1 | 6/2002 | Yates ............................ 297/201 |
| 6,450,572 B1 * | 9/2002 | Kuipers .................... 297/202 X |
| 6,666,507 B1 * | 12/2003 | Ringgard .................. 297/195.1 |
| 6,739,656 B2 | 5/2004 | Yu ............................ 297/215.16 |
| 6,752,453 B1 | 6/2004 | Yapp ......................... 297/215.14 |
| 6,871,907 B2 | 3/2005 | Morita et al. .............. 297/195.1 |
| 6,886,887 B2 * | 5/2005 | Yu ............................ 297/202 X |
| 7,055,900 B2 | 6/2006 | Losio et al. ................ 297/195.1 |
| 7,121,622 B1 * | 10/2006 | Mendez .................... 297/202 X |
| 7,178,869 B2 | 2/2007 | Ljubich ........................ 297/201 |
| 2002/0096917 A1 | 7/2002 | Turudich ...................... 297/202 |
| 2004/0004375 A1 | 1/2004 | Garland et al. ............... 297/204 |
| 2004/0056519 A1 | 3/2004 | Kastarlak .................. 297/195.1 |

(Continued)

OTHER PUBLICATIONS

Chinese Patent Publication No. CN 2262520 Y, Sep. 17, 1997, 06 pages.

(Continued)

*Primary Examiner* — Anthony D Barfield
(74) *Attorney, Agent, or Firm* — Alan Kamrath; Kamrath & Associates PA

(57) ABSTRACT

A bicycle is provided with a saddle. The saddle includes a frame and a padding device. The frame includes a front tray and a rear tray. The padding device includes a front pad and two rear pads. The front pad is installed on the front tray. The rear pads are installed on the rear tray. A space is defined between the front pad and the rear pads. A space is defined between the rear trays.

39 Claims, 21 Drawing Sheets

U.S. PATENT DOCUMENTS

2006/0071516 A1* 4/2006 Pandozy .................. 297/202 X
2007/0108808 A1 5/2007 Chuang .................... 297/195.1
2007/0176472 A1 8/2007 Chuang ........................ 297/202

OTHER PUBLICATIONS

Chinese Patent Publication No. CN 2499308 Y, Jul. 10, 2002, 09 pages.
Chinese Patent Publication No. CN 1629030 A, Jun. 22, 2005, 13 pages.
European Patent Publication No. EP 1394025 A1, Mar. 3, 2004, 14 pages.
Chinese Patent Publication No. CN 1521079Y, Aug. 18, 2004, 10 pages.
Chinese Patent Publication No. CN 2523668Y, Dec. 4, 2002, 15 pages.
Japanese Utility Model Publication No. JP 3012678 U, Jun. 20, 1995, 08 pages.
Japanese Utility Model Publication No. JP 3112830 U, Aug. 25, 2005, 09 pages.
Japanese Patent Publication No. JP 57198179 A, Dec. 4, 1982, 04 pages.
Japanese Utility Model Publication No. JP 3012678 U, Jun. 20, 1995, 08 pages.
Japanese Utility Model Publication No. JP 3112830 U, Aug. 25, 2005, 09 pages.
Japanese Patent Publication No. JP 1992231273 A, Aug. 20, 1992, 5 pages.
Japanese Utility Model Publication No. JP 1993035573 U, May 14, 1993, 12 pages.
Japanese Utility Model Publication No. JP 1943006231 Y, Jun. 8, 1943, 1 page.

* cited by examiner

BICYCLE SADDLE

BACKGROUND OF INVENTION

1. Field of Invention

The present invention relates to a bicycle and, more particularly, to a saddle of a bicycle.

2. Related Prior Art

Shown in FIG. 1 is a conventional bicycle saddle 90 with a substantially triangular form tapering from a rear portion 92 to a front portion 91 through an intermediate portion 93. When a rider sits on the saddle 90, his external genitals are pressed on the intermediate portion 93 of the saddle 90. A long period of time of riding affects the circulation of the rider's blood. Moreover, as a transient portion from the wide rear portion 92 to the narrow front portion 91, the middle section 93 of the saddle 90 rubs against the rider's thighs, and causes uncomfortable feeling to the rider.

As Boston University and some Italian experts discuss in three essays in the Journal of Sexual Medicine, September 2005, the longer the rider rides, the higher the risks of erectile dysfunction and loss of libido are. The perineum 80, between the external genitals 82 and the anus, could be where things go wrong. While sitting on an ordinary saddle, a person has his ischium 81 take his weight. While riding, his perineum 80 takes his weight.

On New York Times Weekly, Oct. 17, 2005, page 6 is a report about the essays in the Journal of Sexual Medicine. According to this report, in the perineum 80 is a sheath called Alcock's canal for containing arteries and nerves leading to the penis. Sitting on the saddle 90, the rider has his perineum take his weight so that the amount of blood that goes to the penis is significantly reduced. By and by, the rider suffers erectile dysfunction and loses libido. Moreover, the rider might suffer saddle-related trauma that results in calcified masses in his scrotum.

Echoing the essays and reports, Mr. Steven Schrader, an expert in the field of external genitals working in the USA National Institute for Occupational Safety and Health, asserts that the poorly designed saddle 90 inevitably entails erectile dysfunction and the problem now is how to respond. The saddle 90 is hazardous to a rider's health, and improvements are needed.

The present invention is therefore intended to obviate or at least alleviate the problems encountered in the prior art.

SUMMARY OF INVENTION

According to the present invention, a bicycle is provided with a saddle. The saddle includes a frame and a padding device. The frame includes a front tray and a rear tray. The padding device includes a front pad and two rear pads. The front pad is installed on the front tray. The rear pads are installed on the rear tray. A space is defined between the front pad and the rear pads. A space is defined between the rear trays.

An advantage of the saddle of the present invention is that the space between the front pad and the rear pads can accommodate the rider's external genitals. The external genitals will not be pressed against the saddle. The scrotum will not be hurt, and a calcified mass will not form in the scrotum.

Another advantage of the saddle of the present invention is that the thighs will not rub against the saddle so that the rider will not feel any pain on the thighs and that the rider can move the thighs without any interference by the saddle.

Still another advantage of the saddle of the present invention is that the space between the rear pads can accommodate the perineum so that the arteries and nerves in the Alcock's canal will not be pressed against the saddle and that the circulation of blood to the penis will not be suppressed.

Other advantages and features of the present invention will become apparent from the following description referring to the drawings.

BRIEF DESCRIPTION OF DRAWINGS

The present invention will be described through detailed illustration of nine embodiments referring to the drawings.

DETAILED DESCRIPTION OF EMBODIMENTS

Figure 1:
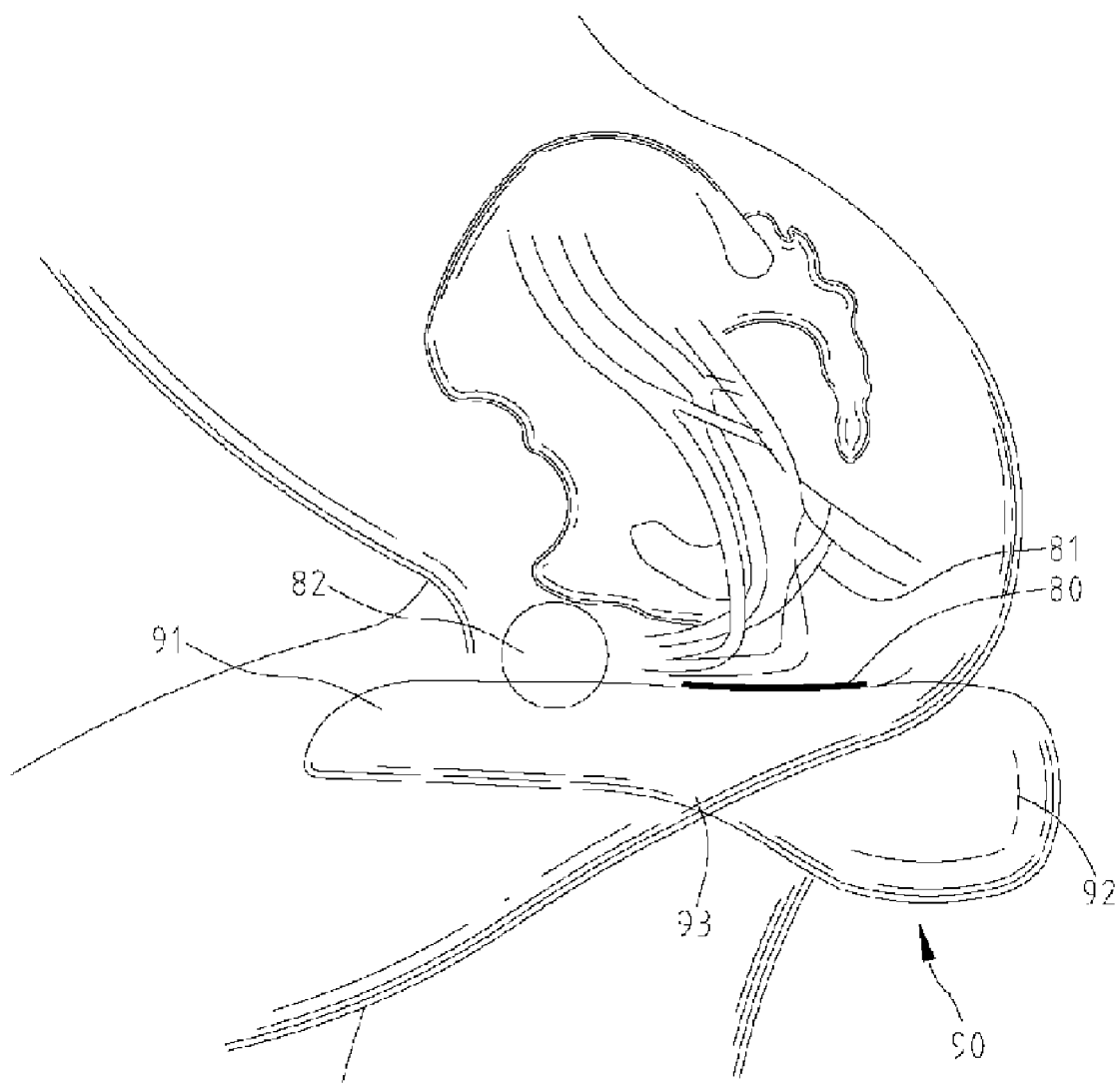
FIG. 1 is a side view of a rider sitting on a conventional saddle of a bicycle.
Figure 2:
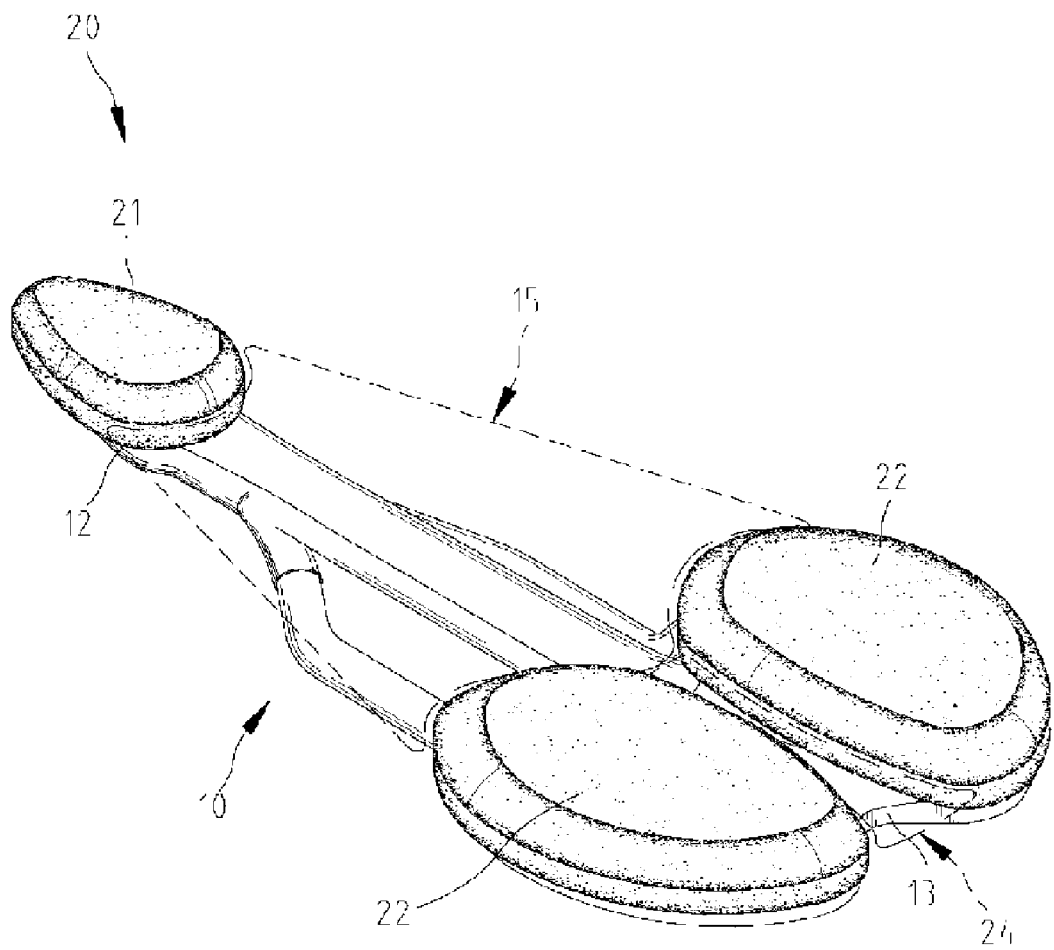
FIG. 2 is a perspective view of a saddle according to the first embodiment of the present invention.
Figure 3:
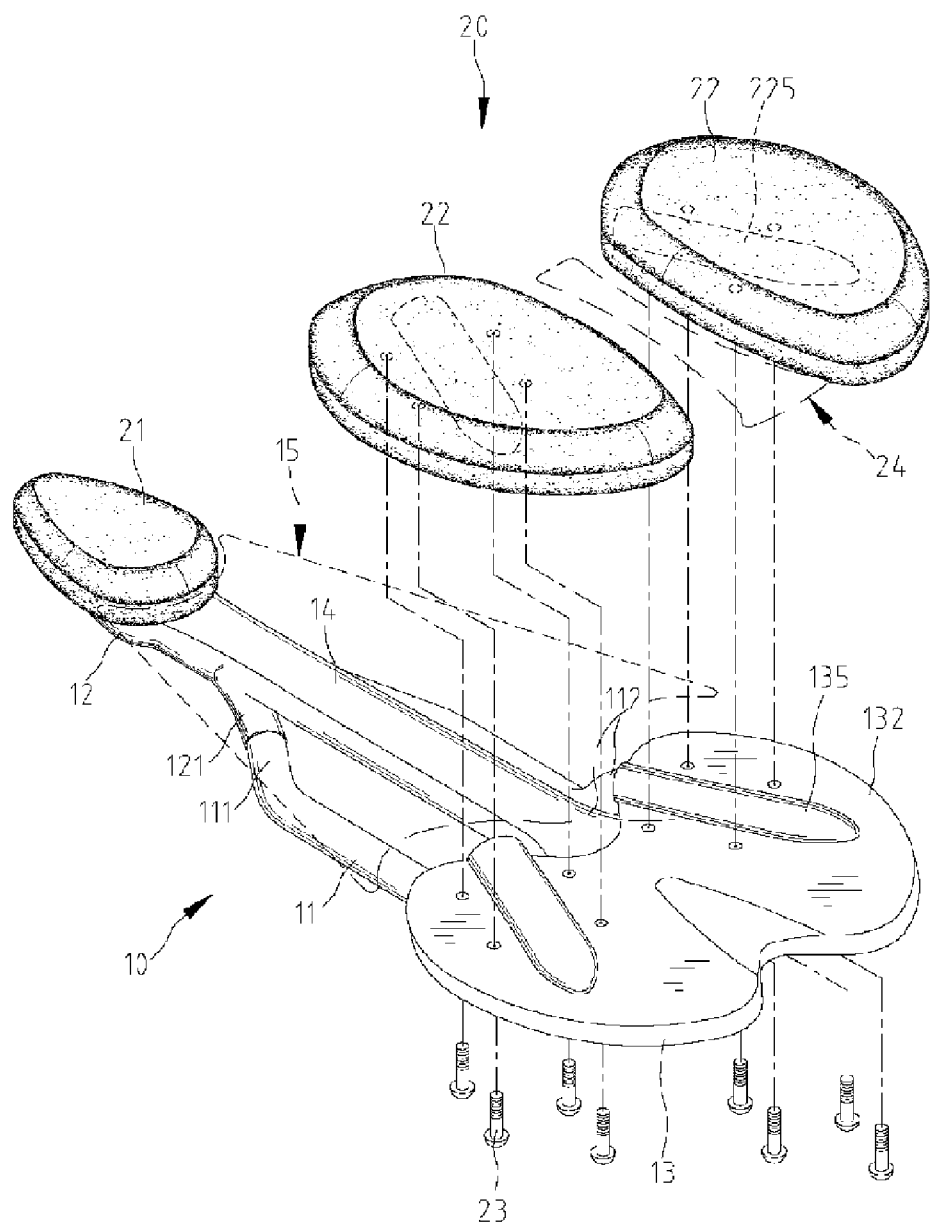
FIG. 3 is an exploded view of the saddle shown in FIG. 2.

Referring to FIGS. 2 through 5, there is shown a saddle for a bicycle according to a first embodiment of the present invention. The saddle includes a frame 10 and a padding device 20.

The frame 10 includes a reinforcement element 14, a front tray 12 formed at a front section of the reinforcement element 14, a rear tray 13 formed at a rear section of the reinforcement element 14 and two beams 11 for connecting the front tray 12 to the rear tray 13. The reinforcement element 14 is used to reinforce the frame 10. The reinforcement element 14 can however be omitted in another embodiment.

Each of the beams 11 includes a front section 111 extending forward and upward and a rear section 112 extending backward and upward. The front sections 111 of the beams 11 extend toward each other. The rear sections 112 of the beams 11 extend away from each other. The beams 11 can be connected to the saddle post of a bicycle.

The front tray 12 includes two sockets 121 on the bottom for receiving the front sections 111 of the beams 11. The front tray 12 includes a flat contact surface 122 on the top.

The rear tray 13 includes two sockets 131 on the bottom for receiving the rear sections 112 of the beams 11. The rear tray 13 includes a flat contact surface 132 on the top and two ridges 135 on the top.

The padding device 20 includes a front pad 21 and two rear pads 22.

The front pad 21 is installed on the contact surface 122 of the front tray 12.

The rear pads 22 are installed on the contact surface 132 of the rear tray 13. Each of the rear pads 22 defines, in defined in the bottom, a groove 225 for receiving related one of the ridges 135 so that the rear pads 22 can precisely positioned on the rear tray 13. The rear pads 22 are secured to the rear tray 13 by a plurality of fasteners 23 such as threaded bolts.

Figure 4:
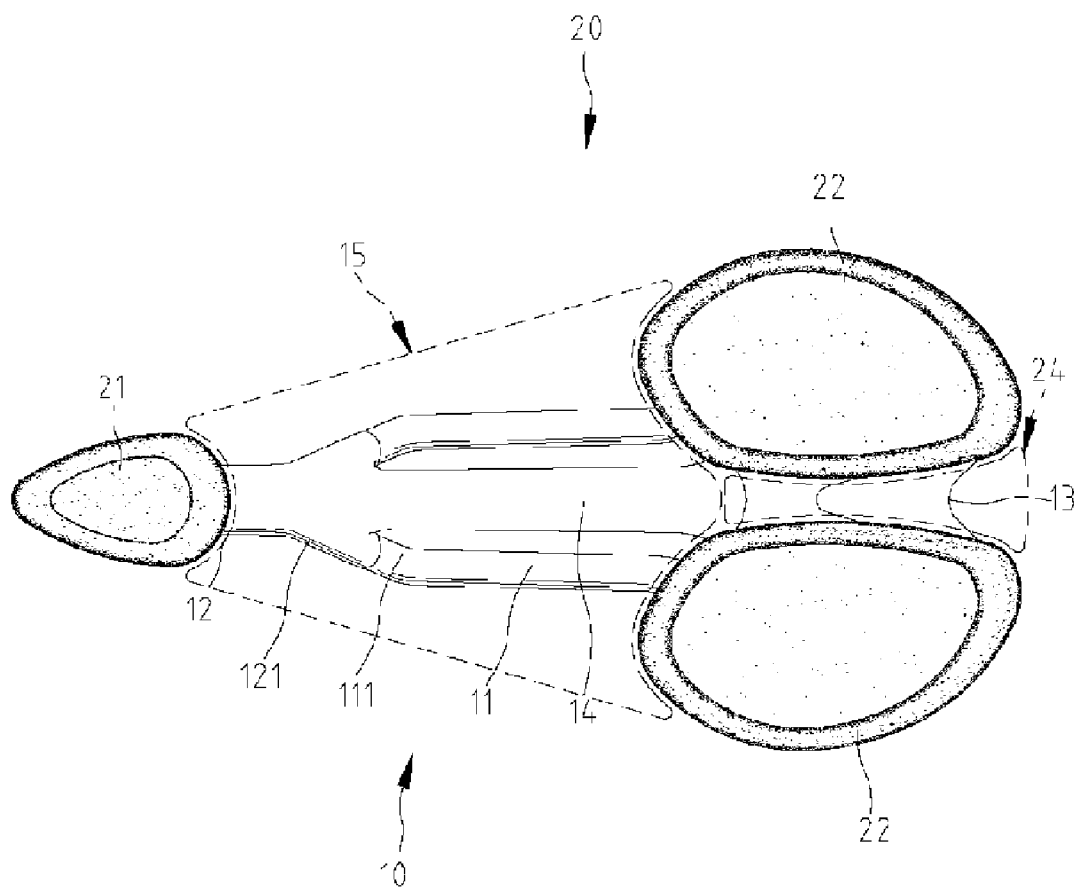
FIG. 4 is a top view of the saddle shown in FIG. 2.
Figure 6:
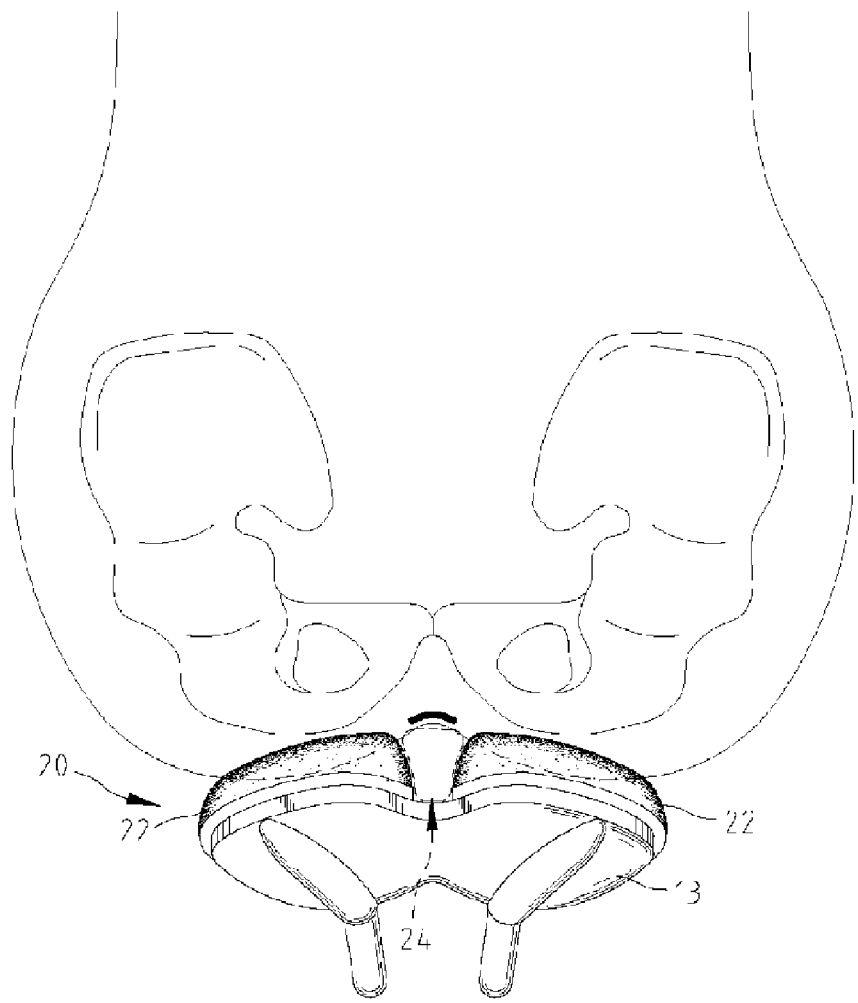
FIG. 6 is a rear view of a rider sitting on the saddle shown in FIG. 2.
Figure 7:
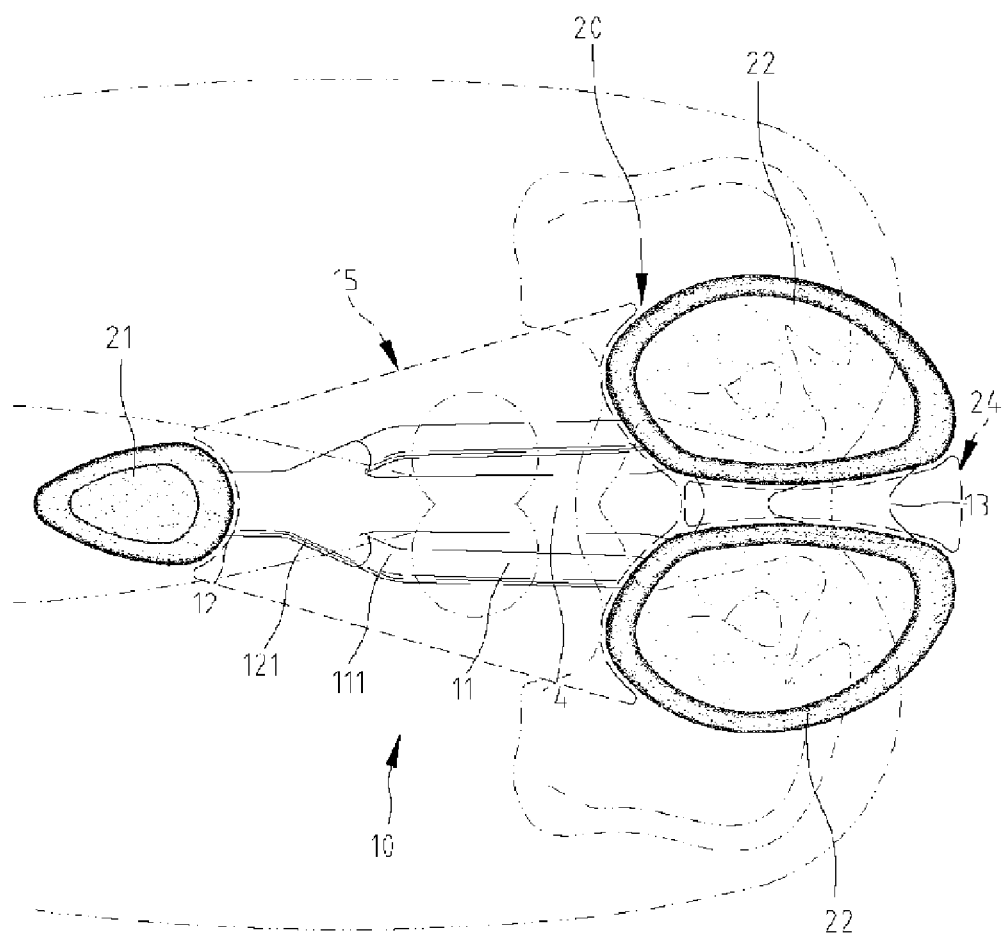
FIG. 7 is a top view of the saddle shown in FIG. 6.

Referring to FIGS. 4, 6 and 7, there is a space 24 between the rear pads 22. With the space 24 between the rear pads 22, a rider's perineum will not be pressed against the saddle. The arteries and nerves in the Alcock's canal will not be pressed. The circulation of blood to the rider's penis will not be suppressed.

Figure 5:
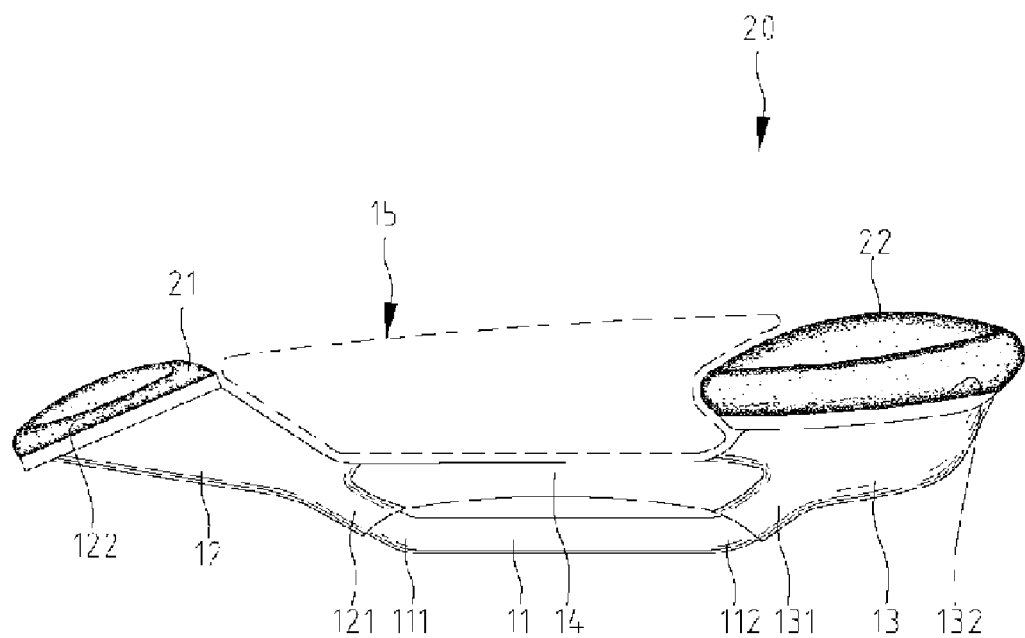
FIG. 5 is a side view of the saddle shown in FIG. 2.
Figure 8:
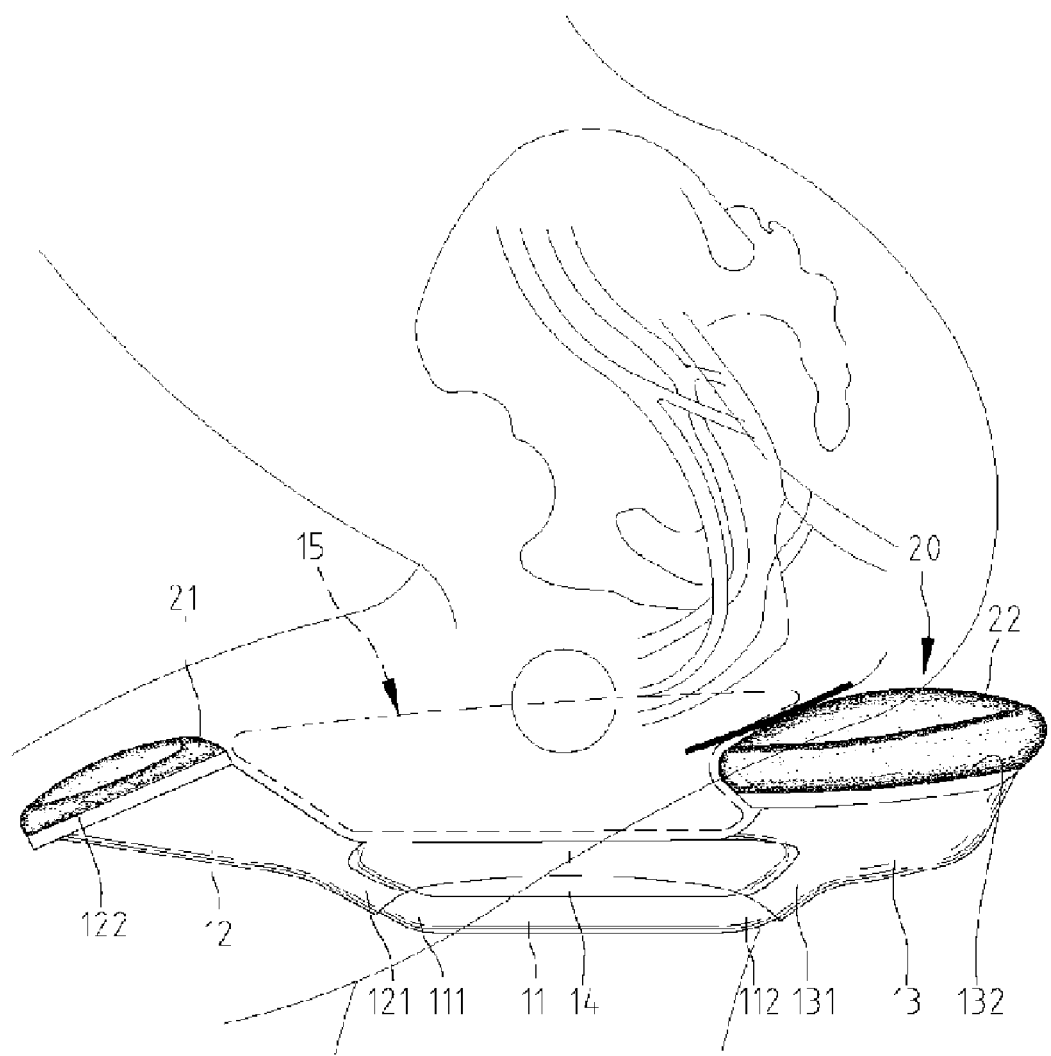
FIG. 8 is a side view of the saddle shown in FIG. 7.

Referring to FIGS. 5, 7 and 8, there is a space 15 above the reinforcement element 14, between the front pad 21 and the rear pads 22. The space 15 can accommodate a rider's perineum and external genitals. The rider's perineum and the external genitals will not be pressed against the saddle. The circulation of blood will not be suppressed. Moreover, the rider's thighs will not rub against the saddle so that the rider will not feel pain in his thigh and that the rider can move the thighs freely.

Figure 9:
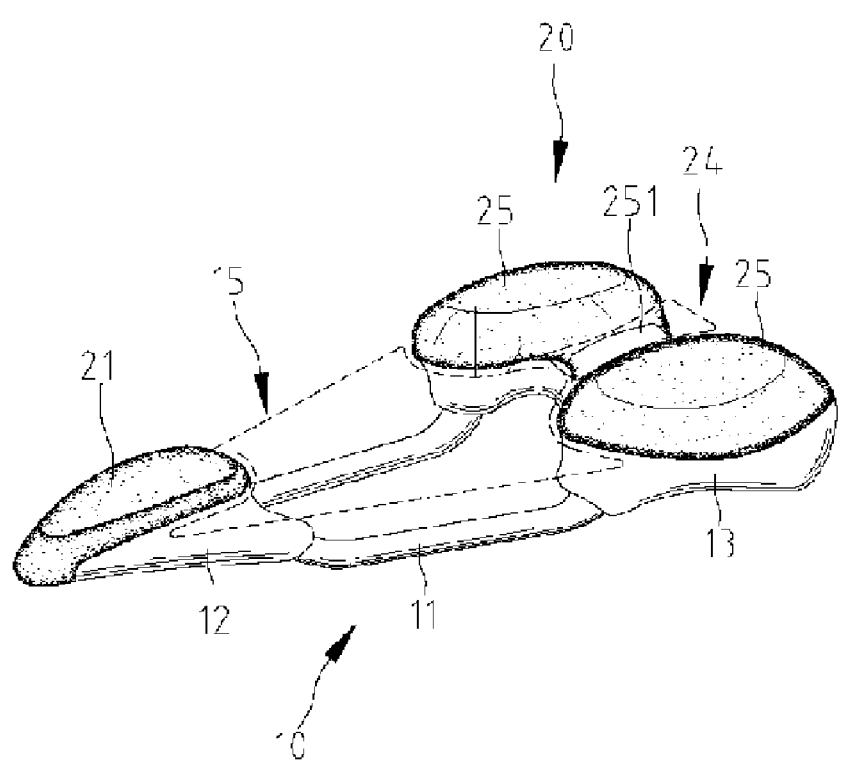
FIG. 9 is a perspective view of a saddle according to the second embodiment of the present invention.

Shown in FIG. 9 is a saddle according to a second embodiment of the present invention. The second embodiment is like the first embodiment except two things. Firstly, the reinforcement element 14 is omitted. Secondly, two rear pads 25 are integrated with each other instead of the rear pads 22 that are separate from each other. The rear pads 25 are integrated by a thin connecting portion 251. The space 24 is still defined between the rear pads 25.

Figure 10:
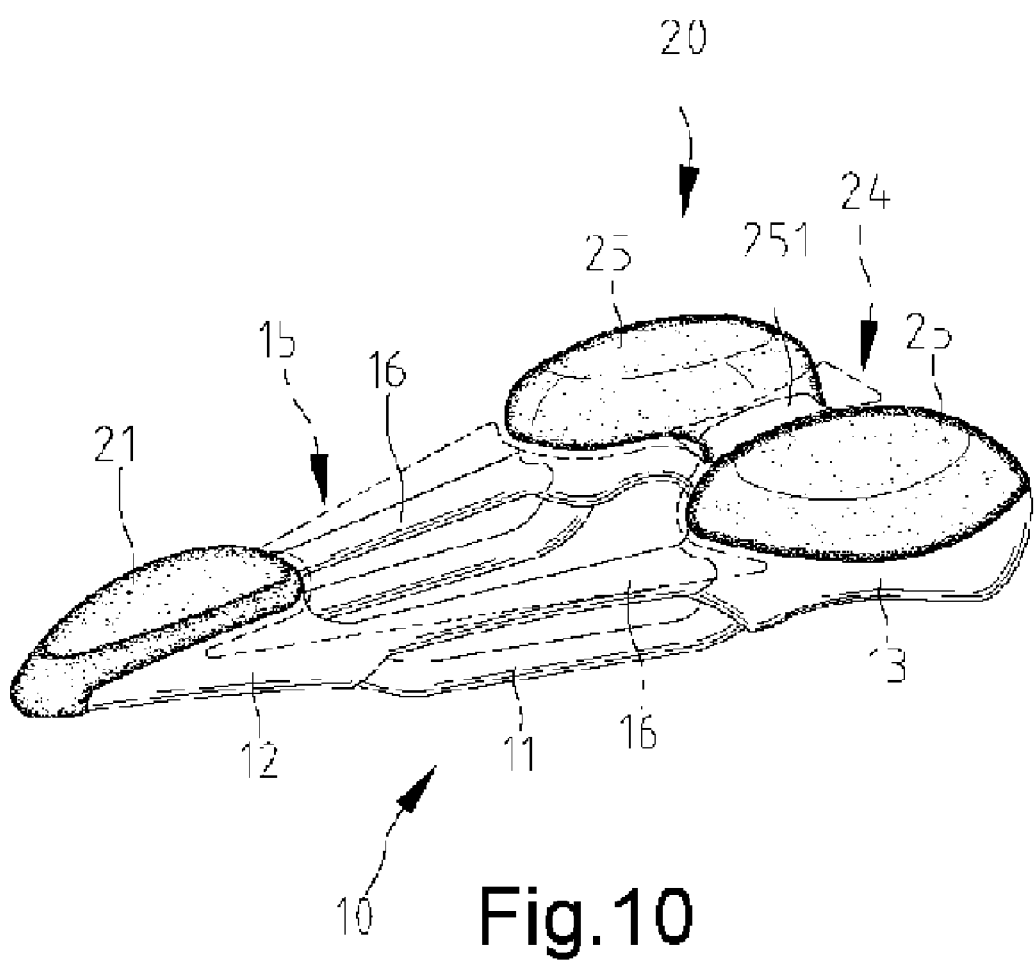
FIG. 10 is a perspective view of a saddle according to the third embodiment of the present invention.

Shown in FIG. 10 is a saddle according to a third embodiment of the present invention. The third embodiment is like the second embodiment except including two reinforcement elements 16 between the front tray 12 and the rear tray 13. Each of the reinforcement elements 16 is located above related one of the beams 11. The space 15 is still defined between the front pad 21 and the rear pads 25.

Figure 11:
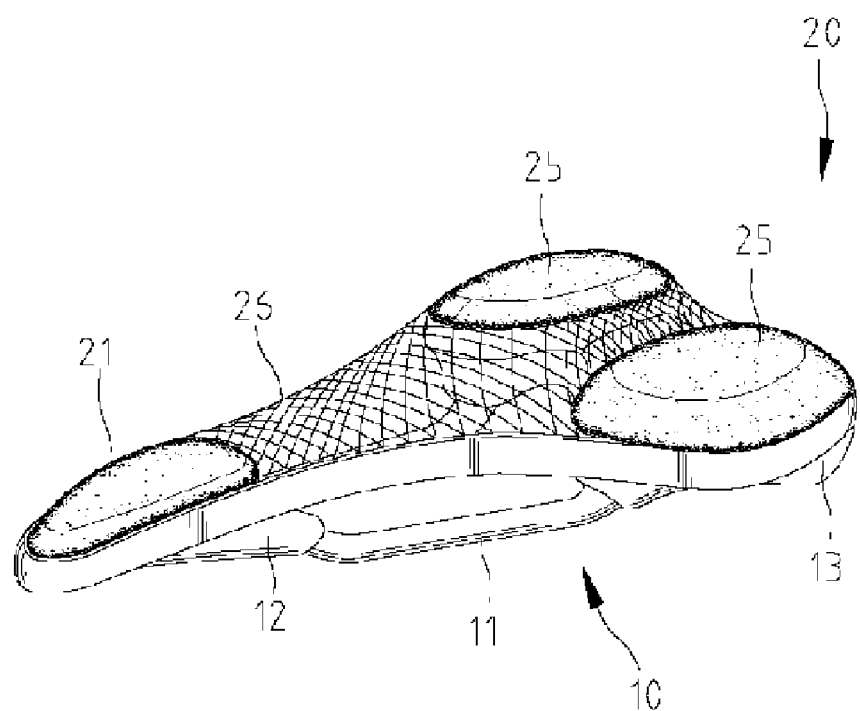
FIG. 11 is a perspective view of a saddle according to the fourth embodiment of the present invention.
Figure 12:
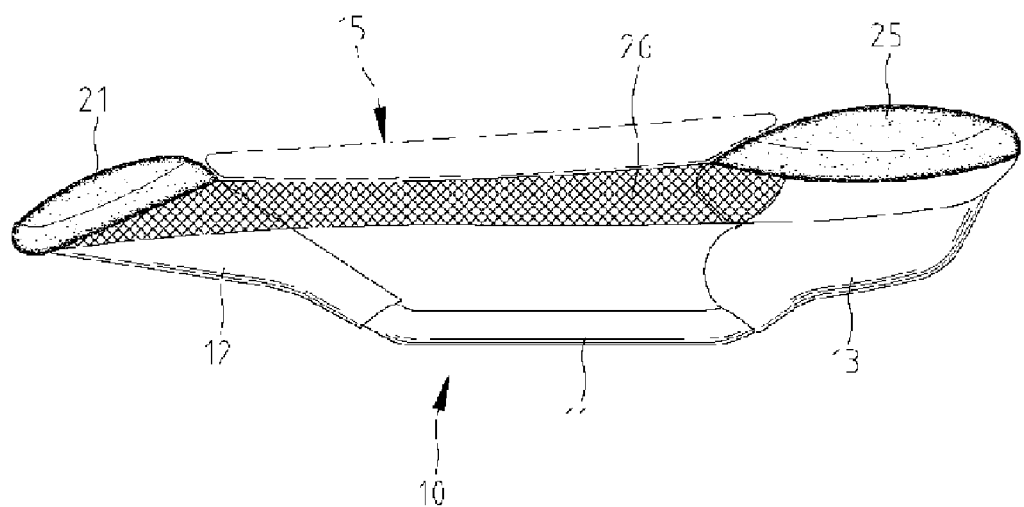
FIG. 12 is a side view of the saddle shown in FIG. 11.

Shown in FIGS. 11 and 12 is a saddle according to a fourth embodiment of the present invention. The fourth embodiment is like the second embodiment except including an elastic web 26 spread between the pads 21 and 25. The elastic web 26 is softer than a sponge pad or a leather pad. The elastic web 26 is preferably a net. The elevation of elastic web 26 is lower than that of the pads 21 and 25 so that the space 15 is still defined between the front pad 21 and the rear pads 25 and that the space 24 is still defined between the rear pads 25. The elastic web 26 supports the rider's external genitals without substantially pressing the rider's external genitals and perineum.

Figure 13:
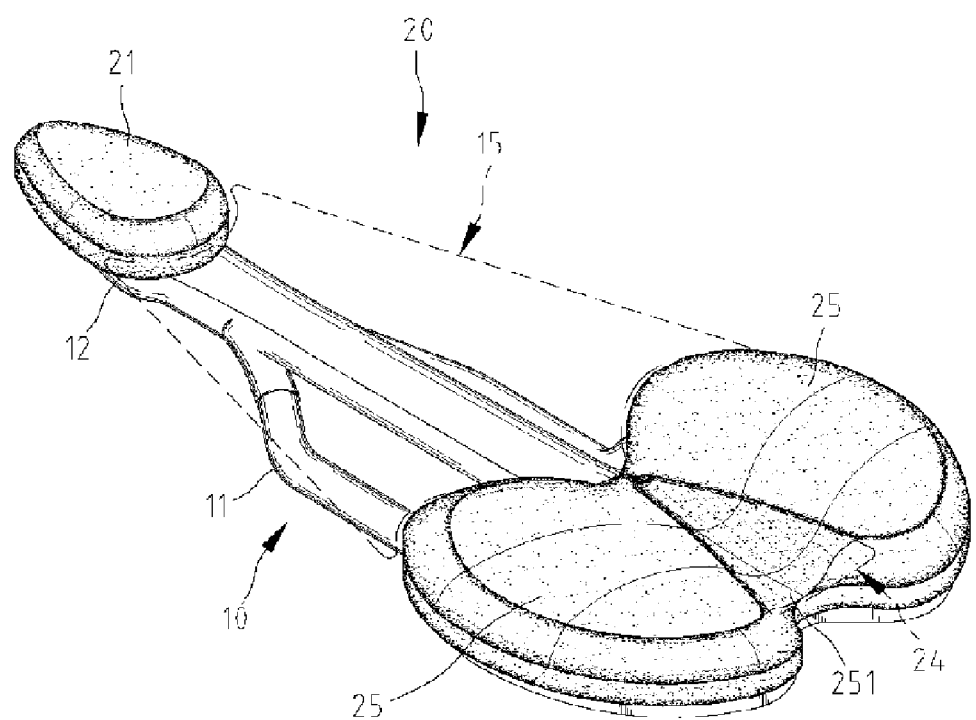
FIG. 13 is a perspective view of a saddle according to the fifth embodiment of the present invention.
Figure 14:
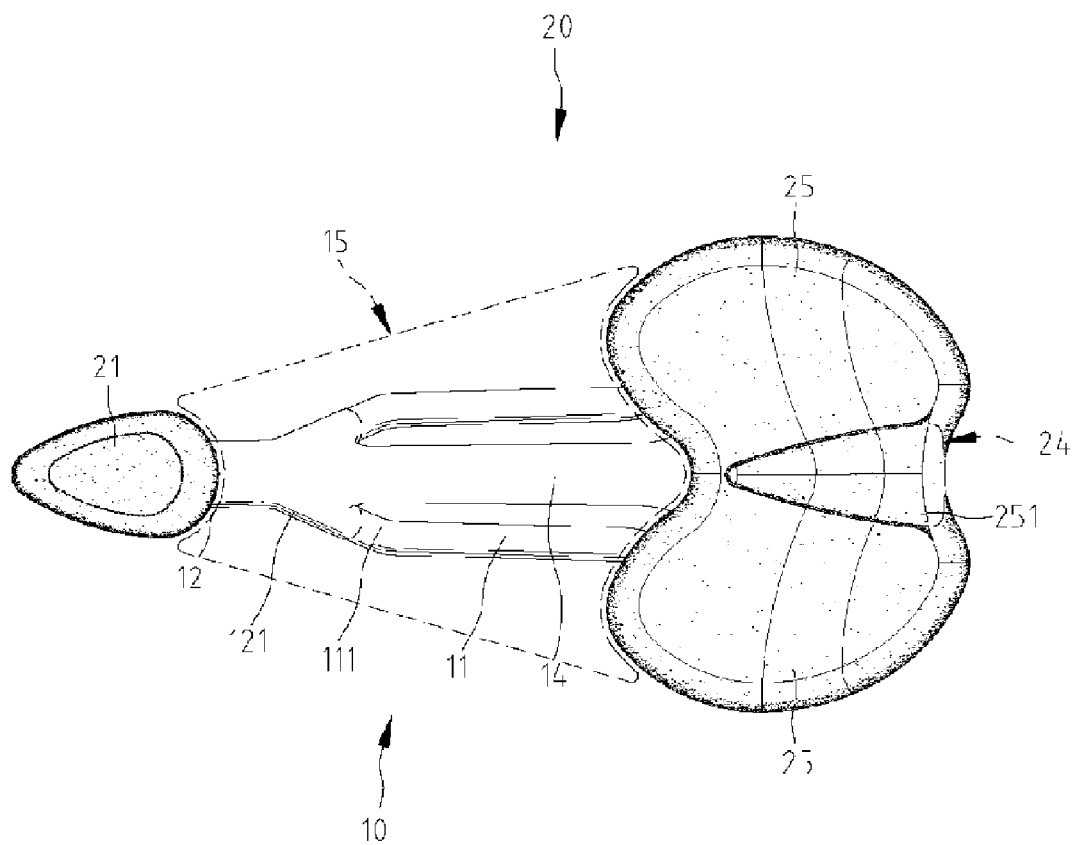
FIG. 14 is a top view of the saddle shown in FIG. 13.

Shown in FIGS. 13 and 14 is a saddle according to a fifth embodiment of the present invention. The fifth embodiment is like the first embodiment except including two rear pads 25 that are integrated with each other via a thin connecting portion 251 instead of the rear pads 21 that are separate from each other. The space 24 is still defined between the rear pads 25. The space 24 gets deeper and wider from the front to the rear.

Figure 15:
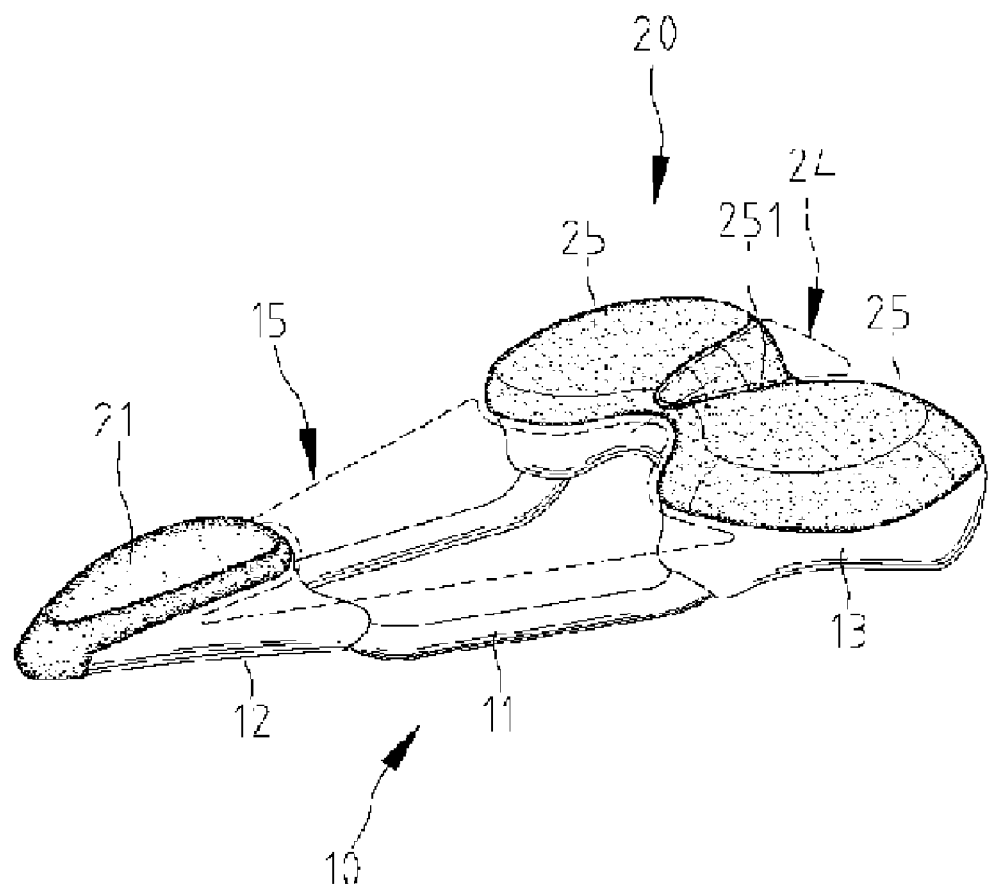
FIG. 15 is a perspective view of a saddle according to the sixth embodiment of the present invention.

Shown in FIG. 15 is a saddle according to a sixth embodiment of the present invention. The sixth embodiment is like the second embodiment except that the space 24 gets deeper and wider instead of evenly deep and wide from the front to the rear.

Figure 16:
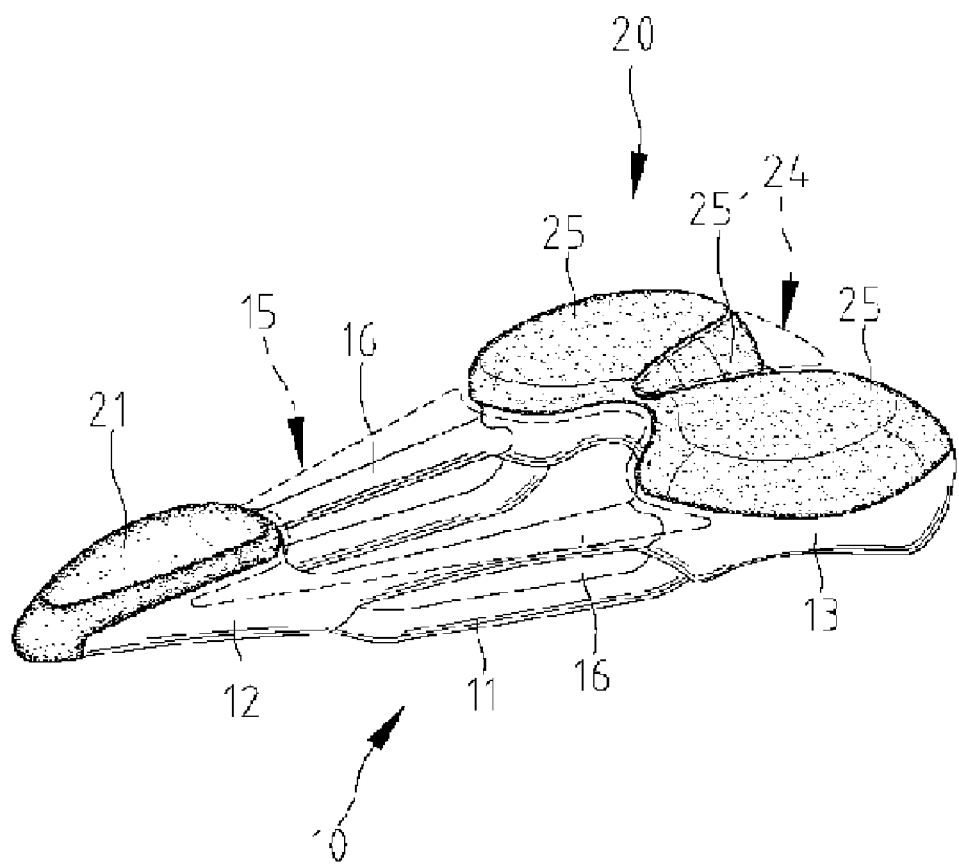
FIG. 16 is a perspective view of a saddle according to the seventh embodiment of the present invention.

Shown in FIG. 16 is a saddle according to a seventh embodiment of the present invention. The seventh embodiment is like the third embodiment except that the space 24 gets deeper and wider instead of evenly deep and wide from the front to the rear.

Figure 17:
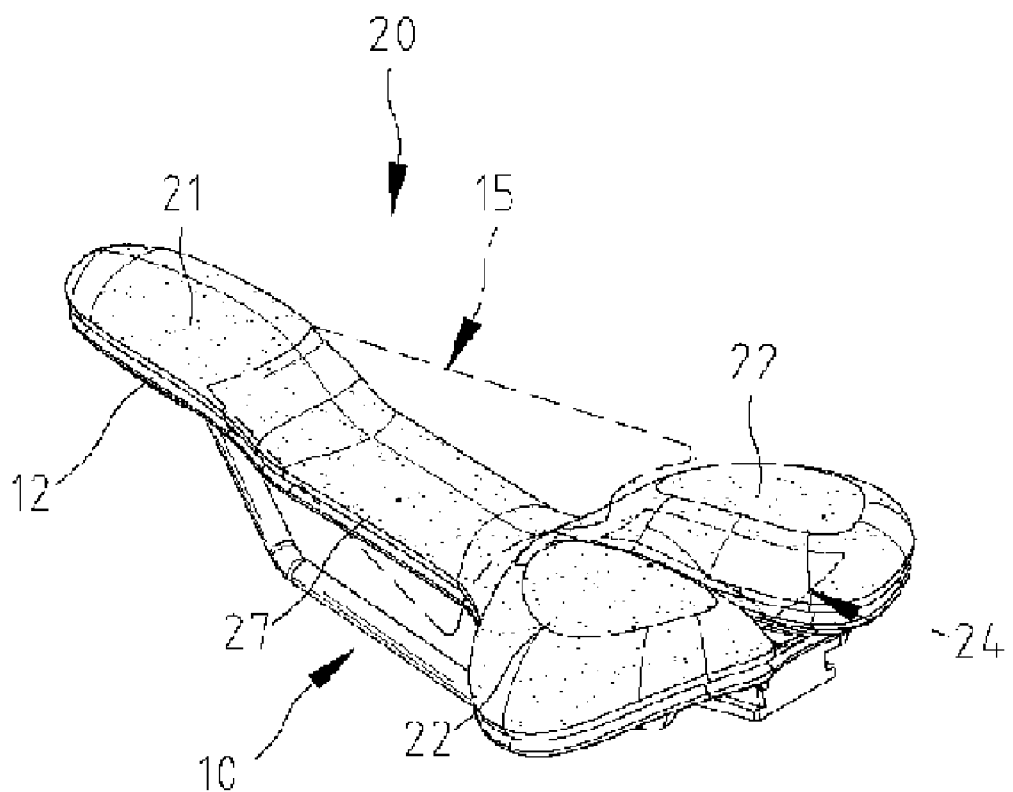
FIG. 17 is a perspective view of a saddle according to the eighth embodiment of the present invention.
Figure 18:
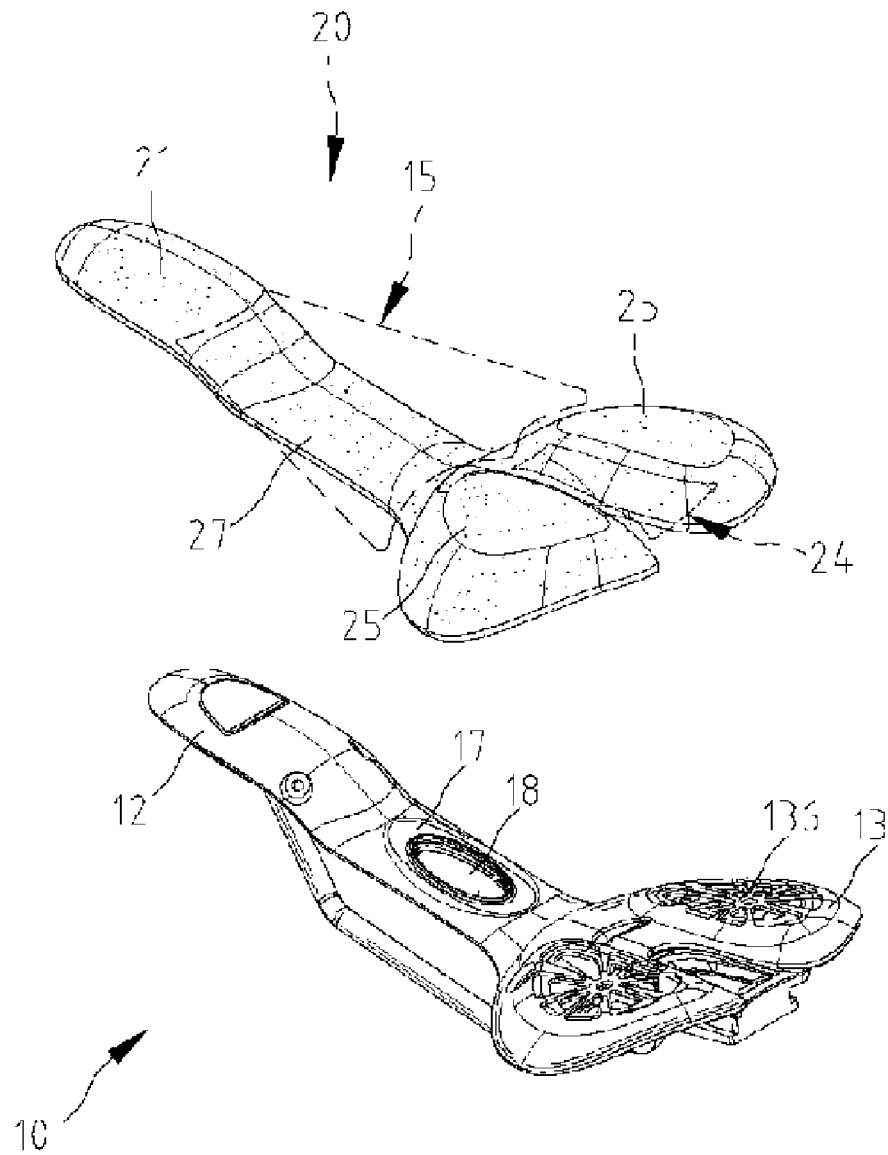
FIG. 18 is an exploded view of the saddle shown in FIG. 17.
Figure 19:
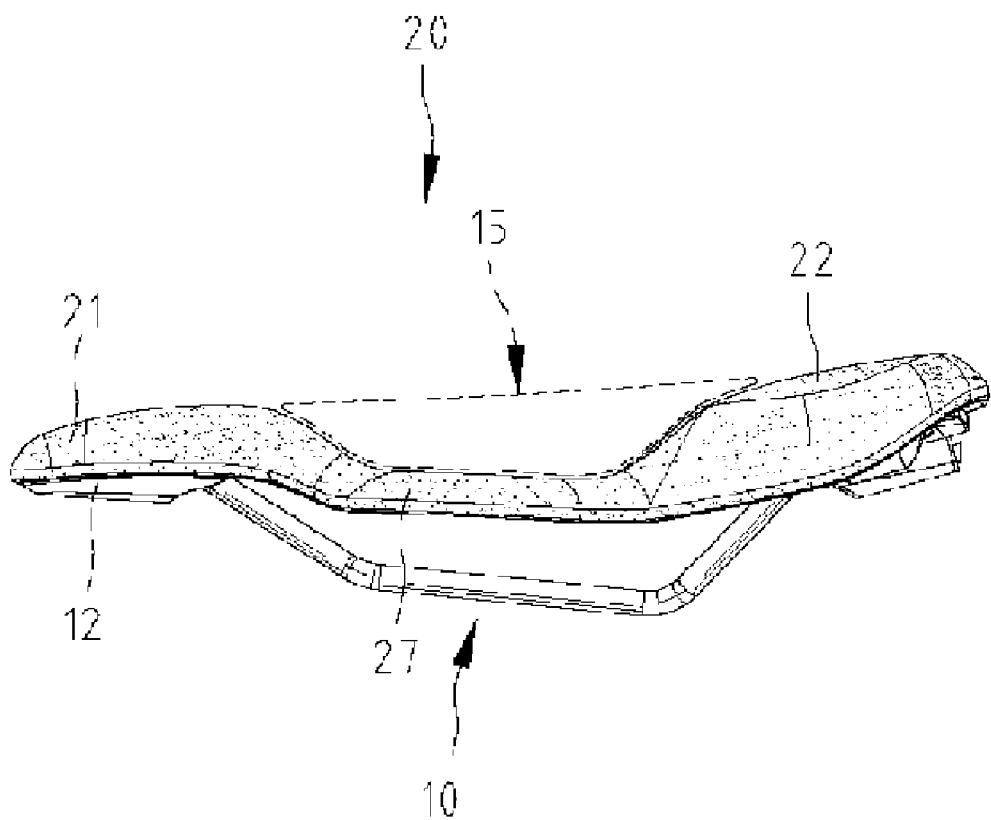
FIG. 19 is a side view of the saddle shown in FIG. 17.

Shown in FIGS. 17 through 19 is a saddle according to an eighth embodiment of the present invention. The saddle includes a frame 10 and a padding element 20.

The frame 10 includes a front tray 12, a rear tray 13 and a connective portion 17 for integrating the front tray 12 with the rear tray 13. That is, the front tray 12, the rear tray 13 and the connective portion 17 are made one. Defined between the trays 12 and 13 and above the connective portion 17 is a space 15 for accommodating the rider's external genitals. The rear tray 13 includes two elastic portions 136 for elastic contact with the rider's hips. The elastic portions 136 are formed by making a plurality of apertures therein. The connective portion 17 defines an opening 18 so as to make the connective portion 17 flexible.

The padding element 20 is substantially shaped corresponding to the frame 10. The padding element 20 includes a front padding portion 21, a rear padding portion 22 and a middle padding portion 27 for integrating the front padding portion 21 with the rear padding portion 22. That is, the front padding portion 21, the rear padding portion 22 and the middle padding portion 27 are made one. The padding element 20 is preferably made of a foam material for providing elasticity and an aesthetically pleasant look.

The padding element 20 is installed on the frame 10. In detail, the front padding portion 21 covers the front tray 12. The rear padding portion 22 covers the rear tray 13. The middle padding portion 27 covers the connective portion 17.

Figure 20:
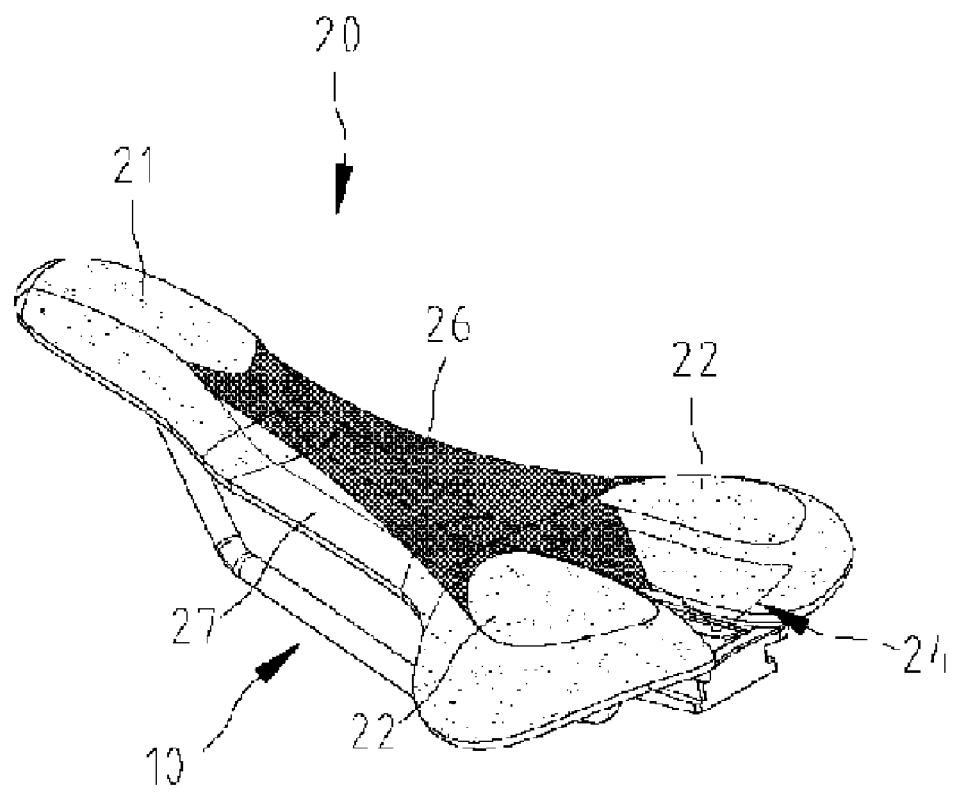
FIG. 20 is a perspective view of a saddle according to the ninth embodiment of the present invention.
Figure 21:
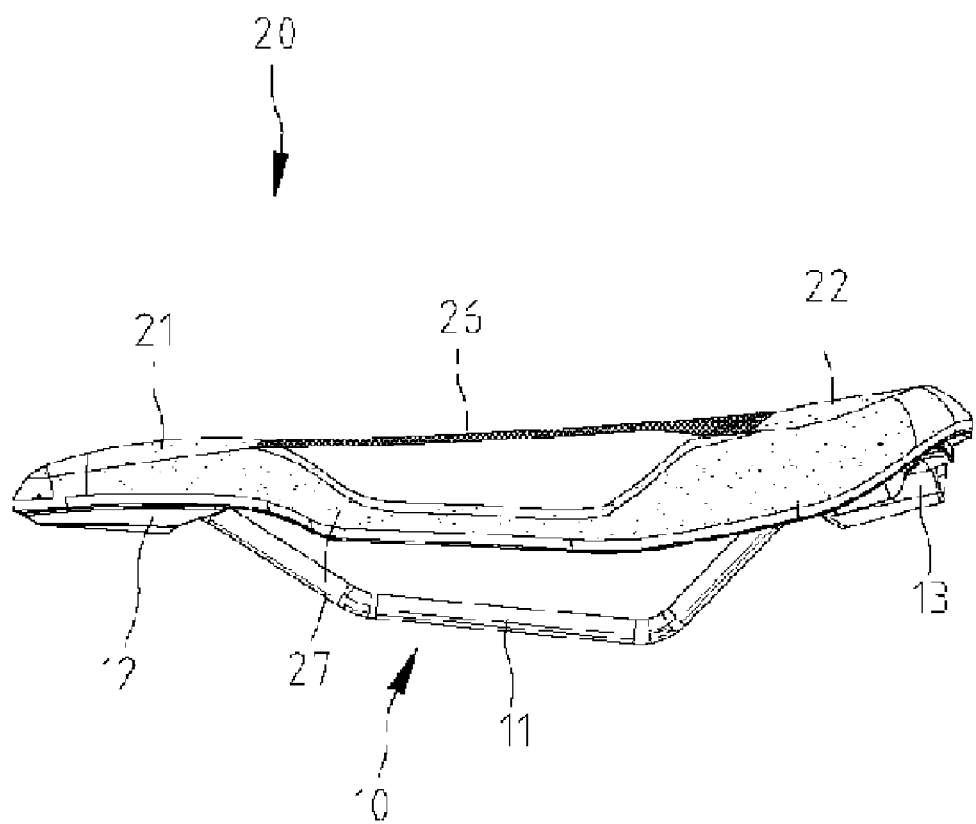
FIG. 21 is a side view of the saddle shown in FIG. 20.

Shown in FIGS. 20 and 21 is a saddle according to a ninth embodiment of the present invention. The ninth embodiment is like the eighth embodiment except including an elastic web 26 between the front padding portion 21 and the rear padding portion 22. The elastic web 26 is used to support the rider's external genitals without excessively pressing the same.

The saddle according to the present invention exhibits the following advantages.

Firstly, the space between the front pad and the rear pads can accommodate the rider's external genitals. The external genitals will not be pressed against the saddle. The scrotum will not be hurt, and a calcified mass will not form in the scrotum.

Secondly, the thighs will not rub against the saddle so that the rider will not feel any pain on the thighs and that the rider can move the thighs without any interference by the saddle.

Thirdly, the space between the rear pads can accommodate the perineum so that the arteries and nerves in the Alcock's canal will not be pressed against the saddle and that the circulation of blood to the penis will not be suppressed.

The present invention has been described through the illustration of the embodiments. Those skilled in the art can derive variations from the embodiments without departing from the scope of the present invention. Therefore, the embodiments shall not limit the scope of the present invention defined in the claims.

What is claimed is:

1. A saddle comprising:
   a frame comprising a front tray, a rear tray and a connective portion for integrating the front tray with the rear tray, with the front and rear trays and the connective portion integrally formed as a single piece, with the front tray and the rear tray being elevated relative to the connective portion, with the front tray and the rear tray spaced from each other;

a padding device comprising a front pad installed on the front tray and a rear pad installed on the rear tray, with the front pad having a top surface at a thickness above the front tray and with the rear pad having a top surface at a thickness above the rear tray, with the padding device and the frame having a combined thickness; and a space defined in the frame above the connective portion and between the front and rear trays, with the space further defined between the front and rear pads on the front and rear trays;

wherein the space has a front edge along the front pad and has a rear edge along the rear pad, with the space being open on two sides of the saddle extending between the front and rear edges of the space and between the front pad and the rear pad, with the space having a depth from a line extending between the top surfaces of the front and rear pads larger than the thickness of the front pad and larger than the thickness of the rear pad and less than the combined thickness of the frame and the padding device, and with the space being entirely above the frame;

wherein the space accommodates a rider's external genitals so that the external genitals will not be pressed against the saddle, the scrotum will not be hurt, and the thighs will not rub against the saddle and can be moved without any interference by the saddle.

2. The saddle according to claim 1 with the connective portion comprising a reinforcement element between the front tray and the rear tray, with the frame further comprising two beams connecting the front tray to the rear tray, and with the rear pad installed on the rear tray comprising two rear pads installed on the rear tray, with the reinforcement element and the two beams being in a spaced relation between the front tray and the rear tray.

3. The saddle according to claim 2 wherein the rear tray comprises two ridges, wherein each of the rear pads defines a groove for receiving related one of the ridges.

4. The saddle according to claim 2 wherein each of the two beams comprises a front section, wherein the front tray comprises two sockets for receiving the front sections of the two beams.

5. The saddle according to claim 4 wherein the front sections of the two beams extend toward each other while extending forward toward the front tray.

6. The saddle according to claim 2 wherein each of the two beams comprises a rear section, wherein the rear tray comprises two sockets for receiving the rear sections of the two beams.

7. The saddle according to claim 6 wherein the rear sections of the two beams extend away from each other while extending backward toward the rear tray.

8. The saddle according to claim 2 wherein the connective portion comprises another reinforcement element between the front tray and the rear tray.

9. The saddle according to claim 8 wherein each of the reinforcement elements is located above a related one of the two beams.

10. The saddle according to claim 1 with the connective portion comprising a reinforcement element between the front tray and the rear tray, and with the frame further comprising two beams for connecting the front tray to the rear tray, with the reinforcement element and the two beams being in a spaced relation between the front tray and the rear tray.

11. The saddle according to claim 10 wherein the rear tray comprises two ridges, wherein the rear pad comprises two grooves for receiving the two ridges.

12. The saddle according to claim 10 wherein each of the two beams comprises a front section, wherein the front tray comprises two sockets for receiving the front sections of the two beams.

13. The saddle according to claim 12 wherein the front sections of the two beams extend toward each other while extending forward toward the front tray.

14. The saddle according to claim 10 wherein each of the two beams comprises a rear section, wherein the rear tray comprises two sockets for receiving the rear sections of the two beams.

15. The saddle according to claim 14 wherein the rear sections of the two beams extend away from each other while extending backward toward the rear tray.

16. The saddle according to claim 10 wherein the connective portion comprises another reinforcement element between the front tray and the rear tray.

17. The saddle according to claim 16 wherein each of the reinforcement elements is located above a related one of the two beams.

18. The saddle according to claim 1 with the frame further comprising two beams each connecting the front tray to the rear tray, with the connective portion being intermediate the two beams and the front and rear tray.

19. The saddle according to claim 18 wherein the connective portion of the frame comprises an opening making the connective portion of the frame elastic.

20. The saddle according to claim 19 wherein the rear tray comprises two elastic portions elastically contacting a rider's hips.

21. The saddle according to claim 20 wherein the elastic portions of the rear tray are made by apertures therein.

22. The saddle according to claim 18 wherein the rear tray comprises two elastic portions elastically contacting a rider's hips.

23. The saddle according to claim 22 wherein the elastic portions of the rear tray are made by apertures therein.

24. The saddle according to claim 1 wherein the connective portion comprises two beams in a spaced relation and each connecting the front tray and the rear tray.

25. A saddle comprising:
a frame comprising a front tray, a rear tray and a connective portion for integrating the front tray with the rear tray, with the front tray and the rear tray being elevated relative to the connective portion;

a padding device comprising a front pad installed on the front tray and a rear pad installed on the rear tray, with the front pad having a top surface at a thickness above the front tray and with the rear pad having a top surface at a thickness above the rear tray, with the padding device and the frame having a combined thickness; and a space defined in the frame above the connective portion and between the front and rear trays, with the space further defined between the front and rear pads on the front and rear trays;

wherein the space has a front edge along the front pad and has a rear edge along the rear pad, with the space being open on two sides of the saddle extending between the front and rear edges of the space and between the front pad and the rear pad, with the space having a depth from a line extending between the top surfaces of the front and rear pads larger than the thickness of the front pad and larger than the thickness of the rear pad and less than the combined thickness of the frame and the padding device, and with the space being entirely above the frame;

wherein the space accommodates a rider's external genitals so that the external genitals will not be pressed against the saddle, the scrotum will not be hurt, and the thighs will not rub against the saddle and can be moved without any interference by the saddle, wherein the rear tray comprises two elastic portions elastically contacting a rider's hips.

26. The saddle according to claim 25 wherein the padding device comprises an elastic web between the pads.

27. The saddle according to claim 26 wherein the elastic web is a net.

28. The saddle according to claim 27 wherein the connective portion comprises two beams in a spaced relation and each connecting the front tray and the rear tray.

29. The saddle according to claim 25 wherein the padding device defines, between the front pad and the rear pads, the space for accommodating a rider's external genitals.

30. The saddle according to claim 25 wherein the padding device defines, between the rear pads, the space for accommodating a rider's perineum.

31. The saddle according to claim 25 wherein the elastic portions of the rear tray are made by apertures therein.

32. A saddle comprising:
a frame comprising a front tray, a rear tray and a connective portion for integrating the front tray with the rear tray, with the front tray and the rear tray being elevated relative to the connective portion;
a padding device comprising a front pad installed on the front tray and a rear pad installed on the rear tray, with the front pad having a top surface at a thickness above the front tray and with the rear pad having a top surface at a thickness above the rear tray, with the padding device and the frame having a combined thickness; and
a space defined in the frame above the connective portion and between the front and rear trays, with the space further defined between the front and rear pads on the front and rear trays;
wherein the space has a front edge along the front pad and has a rear edge along the rear pad, with the space being open on two sides of the saddle extending between the front and rear edges of the space and between the front pad and the rear pad, with the space having a depth from a line extending between the top surfaces of the front and rear pads larger than the thickness of the front pad and larger than the thickness of the rear pad and less than the combined thickness of the frame and the padding device, and with the space being entirely above the frame;
wherein the space accommodates a rider's external genitals so that the external genitals will not be pressed against the saddle, the scrotum will not be hurt, and the thighs will not rub against the saddle and can be moved without any interference by the saddle, wherein the connective portion of the frame comprises an opening making the connective portion of the frame elastic.

33. The saddle according to claim 32 wherein the padding device comprises an elastic web between the pads.

34. The saddle according to claim 33 wherein the elastic web is a net.

35. A saddle comprising:
a frame comprising a front tray, a rear tray and a connective portion for integrating the front tray with the rear tray, with the front tray and the rear tray being elevated relative to the connective portion;
a padding device comprising a front pad installed on the front tray and a rear pad installed on the rear tray, with the front pad having a top surface at a thickness above the front tray and with the rear pad having a top surface at a thickness above the rear tray, with the padding device and the frame having a combined thickness; and
a space defined in the frame above the connective portion and between the front and rear trays, with the space further defined between the front and rear pads on the front and rear trays;
wherein the space has a front edge along the front pad and has a rear edge along the rear pad, with the space being open on two sides of the saddle extending between the front and rear edges of the space and between the front pad and the rear pad, with the space having a depth from a line extending between the top surfaces of the front and rear pads larger than the thickness of the front pad and larger than the thickness of the rear pad and less than the combined thickness of the frame and the padding device, and with the space being entirely above the frame;
wherein the space accommodates a rider's external genitals so that the external genitals will not be pressed against the saddle, the scrotum will not be hurt, and the thighs will not rub against the saddle and can be moved without any interference by the saddle, wherein the padding device comprises a middle pad formed between the front pad and the rear pad and installed on the connective portion of the frame.

36. The saddle according to claim 35 wherein the padding device defines, between the front and rear pads, the space for accommodating a rider's external genitals.

37. The saddle according to claim 35 wherein the rear pad comprises the space for accommodating a rider's perineum.

38. The saddle according to claim 37 wherein the space is evenly deep and wide from the front to the rear.

39. The saddle according to claim 37 wherein the space gets deeper and wider from the front to the rear.

* * * * *